United States Patent
Wimroither

(10) Patent No.: US 7,026,575 B2
(45) Date of Patent: Apr. 11, 2006

(54) DEVICE AND METHOD FOR IDENTIFYING DEFECTS DURING THE FEEDING OF A WELDING ROD

(75) Inventor: Walter Wimroither, Steinbach/Ziehberg (AT)

(73) Assignee: Fronius International GmbH, Pettenbach (AT)

( * ) Notice: Subject to any disclaimer, the term of this patent is extended or adjusted under 35 U.S.C. 154(b) by 5 days.

(21) Appl. No.: 10/475,595

(22) PCT Filed: Apr. 18, 2002

(86) PCT No.: PCT/AT02/00115

§ 371 (c)(1),
(2), (4) Date: Apr. 21, 2004

(87) PCT Pub. No.: WO02/087815

PCT Pub. Date: Nov. 7, 2002

(65) Prior Publication Data
US 2004/0169025 A1 Sep. 2, 2004

(30) Foreign Application Priority Data
Apr. 24, 2001 (AT) .............................. A 660/2001

(51) Int. Cl.
*B23K 9/095* (2006.01)
(52) U.S. Cl. ................................. 219/137.71
(58) Field of Classification Search ............. 219/137.7, 219/131.71
See application file for complete search history.

(56) References Cited

U.S. PATENT DOCUMENTS

| 1,927,896 | A | * | 9/1933 | Meller | 226/24 |
| 3,483,340 | A | * | 12/1969 | Brown | 200/61.18 |
| 3,586,221 | A | * | 6/1971 | Rosen | 219/137.71 |
| 4,261,500 | A | | 4/1981 | Samokovliski et al. | |
| 5,302,805 | A | * | 4/1994 | Morris et al. | 219/137.71 |
| 5,916,464 | A | * | 6/1999 | Geiger | 219/137.71 |
| 6,831,251 | B1 | * | 12/2004 | Artelsmair et al. | 219/137.71 |

FOREIGN PATENT DOCUMENTS

| AT | A1968/99 | 11/1999 |
| DE | 617998 | 8/1935 |
| JP | 49-42550 | 4/1974 |
| JP | 05049137 | 2/1993 |
| WO | WO 01/38034 | 5/2001 |

* cited by examiner

*Primary Examiner*—Clifford C. Shaw
(74) *Attorney, Agent, or Firm*—Collard & Roe, P.C.

(57) ABSTRACT

The invention relates to a device for identifying defects during the feeding of a welding rod. A sensor assembly is located in the welding torch for detecting the feed pressure and the feed tension for the welding rod, a drive device for feeding the welding rod being located downstream of the sensor assembly in the feed direction of the welding rod (in the direction of the arrow).

13 Claims, 2 Drawing Sheets

DEVICE AND METHOD FOR IDENTIFYING DEFECTS DURING THE FEEDING OF A WELDING ROD

CROSS REFERENCE TO RELATED APPLICATIONS

Applicant claims priority under 35 U.S.C. §119 of Austrian Application No. A 660/2001 filed on Apr. 24, 2001. Applicant also claims priority under 35 U.S.C. §365 of PCT/AT02/00115 filed on Apr. 18, 2002. The international application under PCT article 21(2) was not published in English.

The invention relates to a device and a method for detecting errors in the welding wire feed rate.

Patent specification JP-A-500-49137 describes a welding plant, in which the welding wire is fed along from a wire roller via a hose pack to a welding torch. The welding plant has two drive systems, the first drive system being disposed in the region of the wire roller, from which the welding wire is fed into the hose pack. The second drive system is disposed in the region of the welding torch and feeds the welding wire from the hose pack into the welding torch. The hose pack terminates immediately upstream of the second drive system as viewed in the feed direction of the welding wire, as a result of which the wire core follows a curved path in the form of a bend between the hose pack and the drive system. Two contact elements co-operate with this bend so that a contact is established between one of the two contacts and the wire core depending on the size of the bend. This system enables excess welding wire between the two drive systems to be detected so that when the wire core comes into contact with one of the two contact elements, a reduction or increase in the feed rate of at least one drive system is initiated.

Patent specification U.S. Pat. No. 4,261,500 A also describes a wire feed system for advancing a welding wire over a large distance on a modular basis. The wire feed system has several drive systems, in particular a pushing module, an intermediate pushing module and a pulling module. The pushing drive system co-operates with the wire roller whereas the pulling drive system co-operates with the welding torch. The intermediate pushing module is positioned between these two. Means are also provided between the pushing and pulling drive systems for detecting the welding wire feed rate.

A device is known from patent specification JP-A-49-42550, in which the welding wire is fed between two rollers, which are spring-mounted via an arm. The arm is connected to a potentiometer so that a change in resistance occurs when the rollers move. The device is positioned between the two wire feeds. The first wire feed co-operates with the wire roller and feeds the welding wire from the wire roller via the device into the hose pack. The welding wire is also fed forward by the second wire feed, which is disposed in the welding torch or in the region of the welding torch, in other words downstream of the hose pack. When a change in resistance occurs due to a roller movement, at least one wire feed is regulated in order to synchronize the two wire feeds, thereby ensuring a constant feed rate.

Devices and a sensor system are already known from Austrian patent application No. A 1968/99, entitled "Welding wire feed system with main and auxiliary drive", filed by the present applicant. It describes a system whereby the welding wire is deflected from its feed direction in order to detect the feeding pressure. The sensor system or tubular sensor described in this application is used as a means of regulating the feeding pressure. This being the case, the device or tubular sensor is adapted accordingly so that it can be used to operate the solution proposed by the invention.

The underlying objective of the invention is to propose a device and a method of detecting errors in the welding wire feed rate, whereby delivery of the welding wire and in particular the feeding pressure and/or the feeding traction can be monitored.

This objective is achieved due to the fact that a sensor system is provided in the welding torch for detecting the feeding pressure and feeding traction applied to the welding wire, the sensor system having a drive mechanism for the welding wire downstream of it in the direction in which the welding wire is fed.

The advantage of this approach is that providing the sensor system enables burning to be detected or a defect in the pipe bend of the welding wire as well as wear of the wire core or a fault on the wire feed system upstream of the sensor system. This also means that it is possible to ascertain whether a fault has occurred or is shortly about to occur upstream or downstream of the sensor system.

Other advantageous embodiments are described in claims 2 to 7. The resultant advantages may be found in the description.

The objective is also achieved by the invention due to the fact that a feeding pressure and a feeding traction of the welding wire are detected by a sensor system disposed in the welding torch and the sensor system emits a signal whenever the pressure is too high or too low, prompting a control system to run an evaluation.

The advantage of this is that providing the sensor enables caking of the welding wire and wear of the wire core to be detected, so that the control system of the welding wire is prompted to initiate measures accordingly.

Other advantageous features are described in claims 8 to 13. The resultant advantages may be found in the description.

The invention will be described in more detail below with reference to an example of an embodiment.

Figure 1:
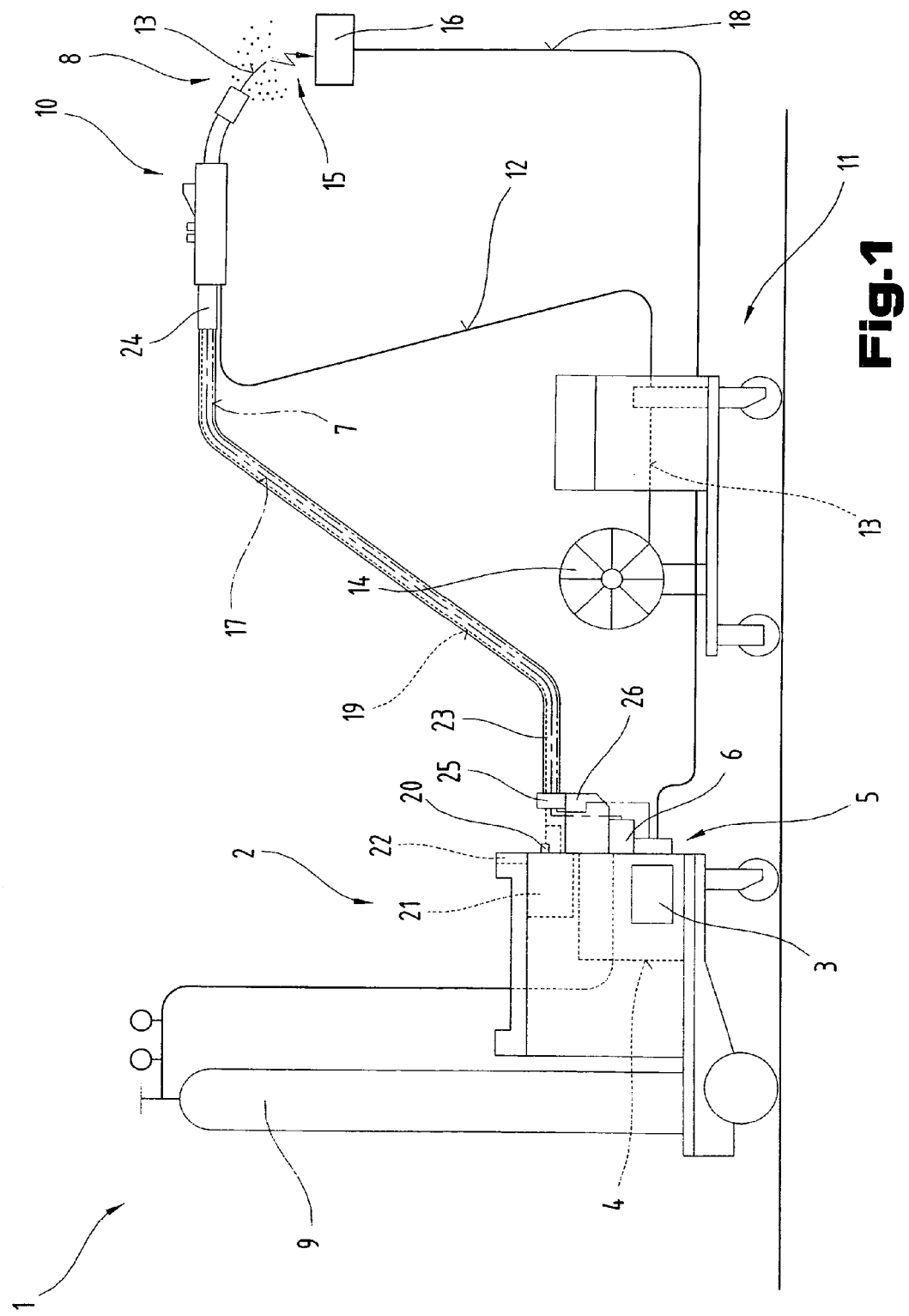
FIG. 1 is a schematic diagram of a welding machine or welding apparatus.

Firstly, it should be pointed out that the same parts described in the different embodiments are denoted by the same reference numbers and the same component names and the disclosures made throughout the description can be transposed in terms of meaning to same parts bearing the same reference numbers or same component names. Furthermore, the positions chosen for the purposes of the description, such as top, bottom, side, etc,. relate to the drawing specifically being described and can be transposed in terms of meaning to a new position when another position is being described. Individual features or combinations of features from the different embodiments illustrated and described may be construed as independent inventive solutions or solutions proposed by the invention in their own right.

FIG. 1 illustrates a welding system and a welding apparatus 1 for a whole range of welding processes, e.g. MIG-MAG welding and TIG welding or electrode welding processes.

Clearly, the solution proposed by the invention may be used with a current source or a welding current source.

The welding apparatus 1 has a welding current source 2 with a power component 3, a control system 4 and a switching element 5 co-operating with the power component 3 and control system 4. The switching element 5 or the control system 4 is connected to a control valve 6 incorporated in a supply line 7 for a gas 8, in particular an inert gas such as $CO_2$, helium or argon and such like, running between a gas storage 9 and a welding torch 10.

Furthermore, a wire feed device 11 such as commonly used for MIG-MAG welding may also be activated via the control system 4 in order to feed a welding wire 13 from a supply reel 14, preferably through a supply line 12 or through a wire core, into the region of the welding torch 10. Clearly, the wire feed device 11 could also be integrated in the welding apparatus 1, in particular in the basic housing, in a manner known from the prior art, rather than used as an add-on device as illustrated in FIG. 1.

The current needed to strike an arc 15 between the welding wire 13 and a workpiece 16 is fed via a supply line 17 from the power component 3 of the current source 2 to the welding torch 10 and the welding wire 13, the workpiece 16 to be welded also being connected to the welding apparatus 1, in particular to the current source 2, via another supply line 18 so that an electric circuit can be established across the arc 15.

In order to cool the welding torch 10, the welding torch 10 can be connected via a cooling circuit 19, with an integrated flow indicator 20, to a fluid container, in particular a water container 21, so that the cooling circuit 19, in particular a fluid pump used to pump the liquid contained in the water container 21, can be activated when the welding torch 10 is switched on, thereby enabling the welding torch 10 and the welding wire 13 to be cooled, for example via coolant lines.

The welding apparatus 1 also has an input and/or output device 22, by means of which a whole range of settings can be entered for welding parameters and operating modes of the welding apparatus 1 or software programmes set up. The welding parameters entered at the input and/or output device 22 are then forwarded to the control system 4, from where they are applied to the individual components of the welding system and the welding apparatus 1.

In the embodiment illustrated as an example here, the welding torch 10 is also connected to the welding apparatus 1 and the welding system by means of a hose pack 23. The individual lines from the welding apparatus 1 to the welding torch 10 are run through the hose pack 23. The hose pack 23 is connected by means of a connector device 24, known from the prior art, to the welding torch 10, whilst the individual lines in the hose pack 23 are connected to the individual contacts of the welding apparatus 1 by means of connecting sockets and plug connectors. To relieve tension on the hose pack 23, the hose pack 23 is connected via a tension-relieving device 25 to a housing 26, in particular the basic housing of the welding apparatus 1.

Figure 2:
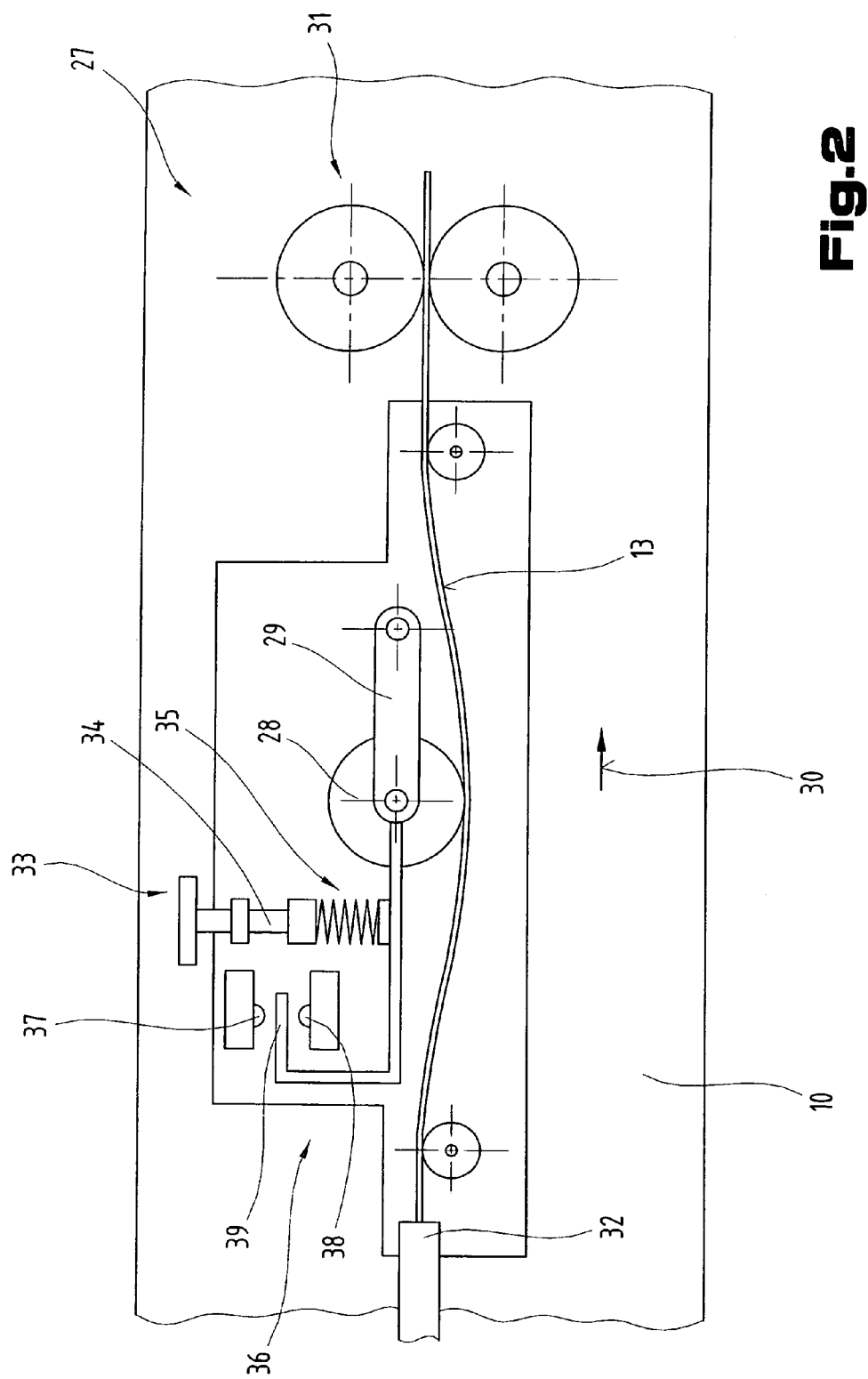
FIG. 2 is a simplified, schematic diagram showing an embodiment of a device, in particular a sensor system, for the welding torch, which detects feeding pressure and feeding traction.

FIG. 2 is a cut-away illustrating a detail of the welding torch 10, which is provided with a device for detecting faults in the welding wire feed rate.

The device is provided in the form of a sensor system 27, disposed in the welding torch 10. The sensor system 27 may be of various different types and is not limited to the embodiment illustrated as an example here. The essential factor is that the sensor system 27 is disposed in the welding torch 10 and is designed to detect the feeding pressure and feeding traction applied to the welding wire 13. For example, the sensor system 27 may be provided in the form of a tubular sensor, of the type for which Austrian patent application A 1968/99 was filed, entitled "Welding wire feed system with main and auxiliary drive".

In the embodiment illustrated as an example here, the sensor system 27 is provided in the form of a rotating wheel 28, which is rotatably mounted via a retaining element 29 so that the rotating wheel 28 sits in contact with the welding wire 13. As also illustrated, the sensor system 27 also has a drive system 31 for feeding the welding wire, disposed downstream of it in the direction in which the welding wire 13 is fed—indicated by arrow 30. The welding torch 10 used is of the type where the wire feed runs directly into the welding torch 10 and another drive system—not illustrated—is therefore also provided in the welding apparatus 1 or in a wire feed device 11.

The purpose of this drive system disposed in the welding apparatus 1 or in the wire feed device 11 is to force the welding wire 13 from the supply reel 14 and simultaneously build up a feeding pressure to push the welding wire 13 through the hose pack 23. The other drive system 31 in the welding torch 10, on the other hand, effects a pulling motion, in particular a feeding traction, on the welding wire 13, i.e. the drive system 31 pulls the welding wire 13 out of the hose pack 23 and then advances it to the contact sleeve of the welding torch 10—not illustrated. With this system, it has been found to be of advantage if the drive system 31 is positioned very close to the contact sleeve of the welding torch 10.

However, to enable the feeding pressure and feeding traction to be detected, the sensor system 27 or rotating wheel 28 must cause the welding wire 13 to deflect out or deflect aside from its feed direction, i.e. the welding wire 13 in the welding torch 10 must be deflected so that it assumes a curved path. This enables the feeding pressure and feeding traction to be detected depending on the extent of the bend or deflection because the extent of the bend or deflection in the welding wire 13 varies depending on the feeding pressure and feeding traction. Consequently, if the bend or deflection is too small, the sensor system 27 will emit a "feed pressure too low" signal, where as if the bend or deflection is too high, the sensor system 27 will emit a "feed pressure too high signal".

Different bends or deflections can be induced in the welding wire 13 because the welding wire 13 is not actually fed through the sensor system 27, thereby making a deflection possible, i.e. a wire core 32 in which the welding wire 13 is run through the hose pack 23 to the welding torch 10 or a guide hose terminates short of the sensor system 23 or inside the sensor system 27, at which point the welding wire 13 runs free. Naturally, it would also be possible for the welding wire 13 to then be fed back into a wire core 32 or into a guide hose.

However, in order to be able to produce a deflection in a predefined direction, the welding wire 13 must effect a predefined deflection, which is induced by the rotating wheel 28, whilst it is still in the sensor system 27. This being the case, if the feeding pressure is too high, the welding wire 13 will be deformed farther in the region of the sensor system 27, leading to an increase in the deflection or extent of bending because more welding wire 13 is fed into the sensor system 27 than is being pulled out by the drive mechanism 31. In the reverse situation, in other words when the feeding pressure is too low, the drive mechanism 31 feeds more welding wire 13 out of the sensor system 27 in the welding torch 13 than is delivered by the drive mechanism in the welding apparatus 1 or the wire feed device 11, so that the deflection or extent of bending is lessened.

This motion of the welding wire 13 can therefore be used as a basis for determining whether the feeding pressure or feeding traction is acting on the welding wire 13 as it is fed along, enabling the feeding pressure and feeding traction to be detected, prompting corresponding signals or process steps to be initiated or ceased. This being the case, the contact force of the rotating wheel 28 on the welding wire 13 can be adjusted via an adjusting mechanism 33, specifically to deflect the welding wire 13, i.e. the adjusting mechanism 33 can set the deflection and hence the feeding pressure, because the rotating wheel 28 and hence the welding wire 13 are deflected at an appropriate pressure by the adjusting mechanism 33, so that this pressure must first be overcome in order to displace the rotating wheel 28.

When the welding wire 13 is deflected transversely to its feed direction due to a pressing force applied via the deflector roller or via the rotating wheel 28, the deflection of the welding wire 13 will remain unchanged if the pushing and pulling action on the welding wire 13 is equal. In other words, the quantity of welding wire 13 pushed forwards corresponds to the quantity of welding wire 13 pulled along by the drive mechanism 31 and the welding wire 13 is "tension-free", i.e. it is tension-free and pressure-free in its longitudinal direction in the cross-sectional region of the rotating wheel 28, in other words subjected to neither a pressure force or a traction force. If, on the other hand, the quantity of welding wire being pulled along is slowed down by the drive mechanism 31, more welding wire 13 is being delivered and this leads to an increase in pressure in the welding wire 13 in the cross-section of the contact region of the rotating wheel 28 and to a more pronounced deflection of the welding wire 13.

If, on the other hand, more welding wire 13 is being pulled away from the region of the rotating wheel 28 than is being delivered by a feed mechanism, not illustrated of the device proposed by the invention for detecting faults in the welding wire 13, which is positioned upstream by reference to the feed direction, a traction force will be generated in the welding wire 13 in the region of the rotating wheel 28, which causes the welding wire 13 to change position opposing the deflection force of the rotating wheel 28 of the sensor system 27, and hence the rotating wheel 28, against the pressing force generated via the rotating wheel 28. Consequently, not only is the device proposed by the invention able to detect the pressure build-up in the welding wire 13 when the quantity of welding wire 13 conveyed down-stream is too high, it is also able to detect the build-up of too high a traction force caused by the drive mechanism 31 in the welding torch 10. Naturally, the build-up of too high a traction force in the welding wire 13 can also be output as a signal or an indication can be issued to the effect that the detected feed pressure is too low. Accordingly, this system for the first time provides a means of determining when there is an increase above or drop below a certain feeding pressure and/or feeding traction and does so in a surprisingly simple manner.

In the embodiment illustrated as an example here, the adjusting mechanism 33 is designed so that a positioning element 34 with a co-operating spring 35 causes a build-up of pressure force on the rotating wheel 28. However, an appropriate pressure is generated in one direction only, although the adjusting mechanism 33 may naturally be designed so that it can generate an appropriate pressure in both directions of the pivoting motion of the rotating wheel 28.

The rotating wheel 28 and/or the retaining element 29 is also connected to a contact element 36 to enable the deflection of the rotating wheel 28 and hence the deflection of the welding wire 13 to be detected via the contact element 36. In the embodiment illustrated as an example here, the contact element 36 is provided in the form of two contacts 37, 38, between which a contact strip 39 is disposed. The contact strip 39 is also joined to the rotating wheel 28 and the retaining element 29 so that when the rotating wheel 28 is deflected far enough, the contact strip 39 sits against one of the two contacts 37, 38, thereby emitting an electric signal. When the deflection is increased, the extent of bending increases so that the contact strip 39 is moved into abutment with the contact 38, whereas when the deflection if reduced, the contact strip 39 is moved into contact with the oppositely lying contact 37.

An exact description of how a sensor system 27 of this type works will not be given in detail because the operating principle is very simple. It should be merely be pointed out that the welding wire 13 is fed in the direction indicated by arrow 30 and the welding wire 13 is deliberately deflected by the rotating wheel 28, so that the pivoting motion of the rotating wheel 28, in particular the deflecting motion, is detected.

By fitting the welding 10 torch with a sensor system 27 of this type, it is now possible to run a process for detecting faults in the welding wire feed rate. The sensor system 27 in the welding torch 10 detects the feeding pressure and feeding traction of the welding wire 13 and a signal is emitted by the sensor system 27 whenever the feeding pressure and feeding traction is too high or too low. The signals output by the sensor system 27 may then be further processed by a control system, in particular by the control system 4 of the welding apparatus 1 and specific measures initiated on the basis of these signals. Accordingly, on the basis of an evaluation by the control system 4 of the welding apparatus 1, the signals from the sensor system 27 may be correlated with the welding process so that during welding start-up, for example, the control system 4 can ascertain that any "feed pressure too low" signal which occurs is not attributable to a fault because the feeding pressure has yet to be built up at this stage. This signal can therefore be suppressed by the control system 4. Correlating the signals from the sensor system 27 with the states of the welding process therefore offers considerable advantages because the control system 4 is able to ascertain whether there actually is a fault or whether the signal was generated due to a change in the welding process.

When the "feed pressure too high" signal is emitted, in other words when the contact strip 39 comes into contact with the contact 38, the control system 4 is informed that a fault is shortly about to occur in the welding wire feed system downstream of the sensor system 27, in particular burning and caking of the welding wire 13 on the contact sleeve, enabling the control system 4 to initiate whatever precautions are needed to prevent burning. If, on the other hand, the "feed pressure too low" signal is emitted, in other words the contact strip 39 has come into contact with the contact 37, the control system 4 is informed that a fault is about to occur in the welding wire feed system at a point before the sensor system 27, in particular wear of the wire core. The control system is therefore able to output a warning signal, for example, so that the wire core 32 can be replaced at the next opportunity.

It is therefore now possible, for the first time, to detect caking and burning of the welding wire 13 on the contact sleeve before it happens and initiate appropriate regulation and control procedures, which has significant advantages, especially in automatic welding plants. The welding wire 13 can be detected upstream of the sensor system 27 because shortly before the welding wire 13 burns and cakes on the contact sleeve, the drive mechanism 31 in the welding torch 10 reduces the feed rate of the welding wire 13 due to the increase in friction losses, causing an increase in the extent of bending or deflection, which is detected by the sensor system 27. Consequently, the control system 4 can briefly reduce the welding current, for example, which in most cases will prevent the welding wire 13 from burning and caking.

Wear on the wire core 32 can be detected because when the feeding pressure is constant, friction losses in the wire core 32 are increased, which means that not so much wire 13 can be delivered by the drive mechanism in the welding apparatus 1 or in the wire feed device 11 and more welding wire 13 is therefore pulled along by the drive mechanism 31 in the welding torch 10, thereby reducing the extent of bending or deflection in the welding wire 13 in the sensor system 27.

Detecting burning of the welding wire 13 and wear on the wire core 32 prevents premature downtimes in automatic welding plants due to faults in the welding wire feed system, thereby reducing down-time costs.

Naturally, the contact element 36 could also be designed so that the motion of the rotating wheel 28 is monitored on a constant basis. To this end, the rotating wheel 28 may be connected to a potentiometer or an incremental transmitter, for example, so that a signal can be emitted when pre-set desired values are exceeded or the values may be evaluated directly by the control system 4.

For the sake of good order, it should be pointed out that in order to provide a clearer understanding of the design of the welding apparatus 1 and the sensor system 27, they and their constituent parts are illustrated to a certain extent out of proportion and/or on an enlarged scale and/or on a reduced scale.

The independent solutions proposed by the invention and the underlying objectives may be found in the description.

Above all, the individual embodiments of the invention illustrated in FIGS. 1; 2 may be construed as independent solutions proposed by the invention in their own right. The associated objectives and solutions may be found in the detailed descriptions of these drawings.

| List of reference numbers | |
|---|---|
| 1 | Welding apparatus |
| 2 | Welding current source |
| 3 | Power component |
| 4 | Control system |
| 5 | Switching element |
| 6 | Control valve |
| 7 | Supply line |
| 8 | Gas |
| 9 | Gas storage |
| 10 | Welding torch |
| 11 | Wire feed device |
| 12 | Supply line |
| 13 | Welding wire |
| 14 | Supply reel |
| 15 | Arc |
| 16 | Workpiece |
| 17 | Welding line |
| 18 | Welding line |
| 19 | Cooling circuit |
| 20 | Flow indicator |
| 21 | Water container |
| 22 | Input and/or output device |
| 23 | Hose pack |

-continued

| List of reference numbers | |
|---|---|
| 24 | Connecting device |
| 25 | Tension-relieving device |
| 26 | Housing |
| 27 | Sensor system |
| 28 | Rotating wheel |
| 29 | Retaining element |
| 30 | Arrow |
| 31 | Drive mechanism |
| 32 | Wire core |
| 33 | Adjusting mechanism |
| 34 | Positioning element |
| 35 | Spring |
| 36 | Contact element |
| 37 | Contact |
| 38 | Contact |
| 39 | Contact strip |

The invention claimed is:

1. System for detecting faults in the welding wire feed rate which may be integrated in or mounted on a welding torch, in which a drive system is disposed on or integrated in a welding torch and in a welding apparatus, characterised in that the welding torch has a sensor system (27) for detecting the feeding pressure and/or feeding traction for the welding wire (13), which is disposed in the welding torch (10) and the sensor system (27) has a drive mechanism (31) downstream of it in the feed direction of the welding wire (13), and the sensor system (27) causes the welding wire to deflect out or deflect aside from its feed direction in the welding torch (10).

2. System as claimed in claim 1, characterised in that the sensor system (27) is provided in the form of a rotating wheel (28), which is pivotably mounted via a retaining element (29) and is designed to sit in contact with the welding wire (13).

3. System as claimed in claim 2, characterised in that an adjusting mechanism (33) is provided to generate the contact force of the rotating wheel (28) on the welding wire (13), in particular to generate the deflection.

4. System as claimed in claim 2, characterised in that the rotating wheel (28) and/or the retaining element (29) is connected to a contact element (36).

5. System as claimed in claim 4, characterised in that the contact element (36) is provided in the form of contacts (37, 38) and a contact strip (39).

6. System as claimed in claim 1, characterised in that the sensor system (27) is a tubular sensor.

7. System as claimed in claim 1, characterised in that the sensor system (27) is designed to emit a "feed pressure too low" signal when the extent of bending or deflection in the welding wire (13) is too low and to emit a "feed pressure too high" signal when the extent of bending or deflection is too high.

8. Method of detecting faults in the welding wire feed rate, whereby the welding wire is fed from the wire supply or wire roller via a drive system into a hose pack and from there is fed via another drive system in the welding torch or in the region of the welding torch on to the welding point, characterised in that a feeding pressure and a feeding traction of the welding wire are detected by a sensor system in the welding torch and the sensor system emits a signal whenever the feeding pressure is too high or too low, and the sensor system has a drive system in the welding torch disposed downstream of it in the feed direction of the welding wire, which causes the welding wire (13) to deflect out or deflect aside from its feed direction in the welding torch (10).

9. Method as claimed in claim 8, characterised in that the welding wire is deflected by the sensor system.

10. Method as claimed in claim 8, characterised in that the sensor system has a rotating wheel, and the motion of the rotating wheel, in particular the deflecting motion, is detected.

11. Method as claimed in claim 8, characterised in that the "feed pressure too high" signal informs a control system that a fault is shortly about to occur downstream of the sensor system, in particular burning of the welding wire on the contact sleeve.

12. Method as claimed in claim 8, characterised in that the "feed pressure too low" signal informs a control system that a fault is shortly about to occur upstream of the sensor system, in particular wear on the wire core.

13. Method as claimed in claim 8, characterised in that the signals of the sensor system are further processed by a control system.

* * * * *